US008897365B2

(12) United States Patent
Reddy et al.

(10) Patent No.: US 8,897,365 B2
(45) Date of Patent: Nov. 25, 2014

(54) VIDEO RATE CONTROL PROCESSOR FOR A VIDEO ENCODING PROCESS

(75) Inventors: Harikrishna Madadi Reddy, San Jose, CA (US); Himadri Choudhury, Santa Clara, CA (US); Manindra Parhy, Fremont, CA (US); Liang Cheng, San Jose, CA (US)

(73) Assignee: Nvidia Corporation, Santa Clara, CA (US)

( * ) Notice: Subject to any disclaimer, the term of this patent is extended or adjusted under 35 U.S.C. 154(b) by 1022 days.

(21) Appl. No.: 12/274,237

(22) Filed: Nov. 19, 2008

(65) Prior Publication Data
US 2010/0124279 A1 May 20, 2010

(51) Int. Cl.
| | |
|---|---|
| H04L 29/06 | (2006.01) |
| G06F 21/00 | (2013.01) |
| G06K 9/36 | (2006.01) |
| H04N 7/26 | (2006.01) |
| H04N 7/12 | (2006.01) |
| H04N 19/61 | (2014.01) |
| H04N 19/42 | (2014.01) |
| H04N 19/115 | (2014.01) |
| H04N 19/137 | (2014.01) |
| H04N 19/149 | (2014.01) |
| H04N 19/176 | (2014.01) |
| H04N 19/124 | (2014.01) |
| H04N 19/164 | (2014.01) |
| H04B 1/66 | (2006.01) |
| H04N 7/30 | (2006.01) |

(52) U.S. Cl.
CPC ..... *H04N 19/0009* (2013.01); *H04N 19/00781* (2013.01); *H04N 19/00478* (2013.01); *H04N 19/0006* (2013.01); *H04N 19/00145* (2013.01); *H04N 19/00181* (2013.01); *H04N 19/00278* (2013.01); *H04N 19/00236* (2013.01)
USPC ............ 375/240.16; 375/240.03; 375/240.24; 382/238

(58) Field of Classification Search
USPC ............ 375/240.16, 240.03, 240.24; 382/238
See application file for complete search history.

(56) References Cited

U.S. PATENT DOCUMENTS 6,111,913 A * 8/2000 Murdock et al. ......... 375/240.03
6,332,003 B1 12/2001 Matsuura et al.
(Continued)

FOREIGN PATENT DOCUMENTS

EP 2061249 A1 5/2009
WO WO 2012162549 A2 * 11/2012

OTHER PUBLICATIONS

Jun Xin ; Lin, Chia-Wen ; Ming-Ting Sun; "Digital Video Transcoding"; Proceedings of the IEEE vol. 93 , Issue: 1, Digital Object Identifier: 10.1109/JPROC.2004.839620; Publication Year: Jan. 2005; pp. 84-97.*

(Continued)

*Primary Examiner* — Kambiz Zand
*Assistant Examiner* — Courtney Fields

(57) ABSTRACT

A system for executing video encoding operations. The system includes a video encoder for encoding an incoming video stream into a plurality of macro blocks. A motion estimation engine is coupled to the video encoder for controlling the encoding of the macro blocks. A video rate control processor is coupled to the video encoder and coupled to the motion estimation engine. The video rate control processor receives a plurality of parameters from the video encoder that indicate an encoding complexity for a macro block and a video frame of the video stream and, upon receiving an indication from the motion estimation engine, computes a quantization parameter for the macro block. The quantization parameter is dynamically adjusted for the video stream to achieve a target bit rate.

9 Claims, 5 Drawing Sheets

(56) References Cited

U.S. PATENT DOCUMENTS

| | | |
|---|---|---|
| 7,206,456 B2 | 4/2007 | Hannuksela et al. |
| 7,826,529 B2 * | 11/2010 | Lee et al. ............... 375/240.03 |
| 8,228,997 B1 * | 7/2012 | Cahalan et al. .......... 375/240.24 |
| 8,605,791 B2 | 12/2013 | Choudhury |
| 2002/0025077 A1 * | 2/2002 | De Haan et al. ............... 382/238 |
| 2005/0169371 A1 * | 8/2005 | Lee et al. ............... 375/240.03 |
| 2005/0231588 A1 | 10/2005 | Yang et al. |
| 2007/0115366 A1 | 5/2007 | Tsubaki |
| 2008/0025392 A1 * | 1/2008 | Lee et al. ............... 375/240.03 |
| 2008/0225945 A1 * | 9/2008 | Wu et al. ............... 375/240.03 |
| 2008/0253463 A1 | 10/2008 | Lin et al. |
| 2009/0086816 A1 * | 4/2009 | Leontaris et al. ........ 375/240.16 |
| 2009/0274209 A1 | 11/2009 | Garg et al. |
| 2010/0054339 A1 | 3/2010 | Schlanger et al. |

OTHER PUBLICATIONS

Adaptive encoding of zoomable video streams based on user access pattern Khiem Quang Minh Ngo, Ravindra Guntur, Wei Tsang Ooi; Feb. 2011; MMSys '11: Proceedings of the second annual ACM conference on Multimedia systems; Publisher: ACM; pp. 211-222.

* cited by examiner

VIDEO RATE CONTROL PROCESSOR FOR A VIDEO ENCODING PROCESS

FIELD OF THE INVENTION

The present invention is generally related to digital computer systems.

BACKGROUND OF THE INVENTION

The display of images and full-motion video is an area of the electronics industry improving with great progress in recent years. The display and rendering of high-quality video, particularly high-definition digital video, is a primary goal of modern video technology applications and devices. Video technology is used in a wide variety of products ranging from cellular phones, personal video recorders, digital video projectors, high-definition televisions, and the like. The emergence and growing deployment of devices capable of high-definition video generation and display is an area of the electronics industry experiencing a large degree of innovation and advancement.

The video technology deployed in many consumer electronics-type and professional level devices relies upon one or more video processors to format and/or enhance video signals for display. This is especially true for digital video applications. For example, one or more video processors are incorporated into a typical set top box and are used to convert HDTV broadcast signals into video signals usable by the display. Such conversion involves, for example, scaling, where the video signal is converted from a non-16×9 video image for proper display on a true 16×9 (e.g., widescreen) display. One or more video processors can be used to perform scan conversion, where a video signal is converted from an interlaced format, in which the odd and even scan lines are displayed separately, into a progressive format, where an entire frame is drawn in a single sweep.

Additional examples of video processor applications include, for example, signal decompression, where video signals are received in a compressed format (e.g., MPEG-4, H264, H263, etc.) and are decompressed and formatted for a display. Another example is re-interlacing scan conversion, which involves converting an incoming digital video signal from a DVI (Digital Visual Interface) format to a composite video format compatible with the vast number of older television displays installed in the market.

More sophisticated users require more sophisticated video processor functions, such as, for example, In-Loop/Out-of-loop deblocking filters, advanced motion adaptive de-interlacing, input noise filtering for encoding operations, polyphase scaling/re-sampling, sub-picture compositing, and processor-amplifier operations such as, color space conversion, adjustments, pixel point operations (e.g., sharpening, histogram adjustment etc.) and various video surface format conversion support operations.

One of the more popular features for incorporation into modern video processors is the implementation of powerful real-time video compression. Video compression, or video encoding, typically operates on square-shaped groups of neighboring pixels, often called "macro blocks." These pixel groups, or macro blocks, are compared from one frame to the next and the video compression codec (e.g., for an encode-decode scheme) sends only the differences within those blocks. This works extremely well if the video has small on amounts of motion. A still frame of text, for example, can be repeated with very little transmitted data. In areas of video with more motion, more pixels change from one frame to the next, and thus, the video compression scheme must send more data to keep up with the larger number of pixels that are changing.

Typically, some of the most compelling content can often have very intense action scenes (e.g., large amounts of motion, explosions, etc.). It takes a very powerful video processing architecture to handle such intense video. Such video typically has a great deal of high frequency detail, and in order to maintain frame rate, the video processor needs to either decrease the quality of the video, or increase the bit rate of the video to render this added information with the same level of detail.

The problem with providing such sophisticated video encoding functionality is the fact that a video processor needs to deliver acceptable performance even under conditions where video frames have sudden bursts of high frequency detail. Similarly, the video processor needs deliver acceptable performance and under conditions where the communications channel is variable (e.g., varying amounts of noise, varying amounts of available bandwidth). Having a sufficiently powerful architecture to implement such encoding functions can be excessively expensive to incorporate into many types of devices. The more sophisticated the video processing functions, the more expensive, in terms of silicon die area, transistor count, memory speed requirements, etc., the integrated circuit device required to implement such functions will be.

Thus what is needed, is a new video encoding system that overcomes the limitations on the prior art. The new video encoding system should be capable of dealing with varying channel conditions and have a high encoding performance to handle the sophisticated video functions expected by increasingly sophisticated users.

SUMMARY OF THE INVENTION

Embodiments of the present invention provide a video encoding system that is capable of accommodating varying communications channel conditions. Embodiments of the present invention enable real-time high-performance video encoding functions for desktop applications, laptop applications, and handheld applications.

In one embodiment, the present invention is implemented as a system for executing video encoding operations. The system includes a video encoder for encoding an incoming video stream into a plurality of macro blocks. A motion estimation engine is coupled to the video encoder for controlling the encoding of the macro blocks. A video rate control processor is coupled to the video encoder and coupled to the motion estimation engine. The video rate control processor receives a plurality of parameters from the video encoder that indicate an encoding complexity for a macro block and a video frame of the video stream. Upon receiving an indication from the motion estimation engine, the video rate control processor computes a quantization parameter for the macro block. The quantization parameter is dynamically adjusted for the video stream to achieve, for example, a target bit rate.

In one embodiment, one of the plurality of parameters received by the video rate control processor can be SAD (sum of absolute difference). Another one of the parameters can be MAD (mean absolute difference). Additionally, one of the parameters can describe the position of a macro block within the video frame and/or the position of the video frame within a group of video frames.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

Figure 1:
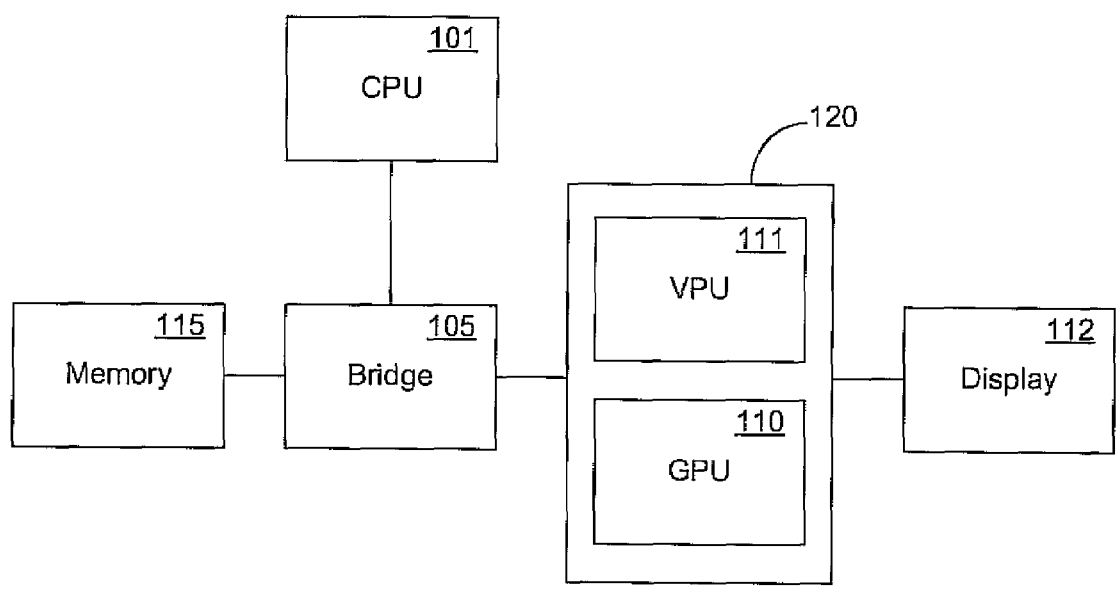
FIG. 1 shows a diagram of an exemplary generalized computer system architecture in accordance with one embodiment of the present invention.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Notation and Nomenclature:

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of a computer system, or similar electronic computing device (e.g., system 100 of FIG. 1), that manipulates and transforms data represented as physical (electronic) quantities within the computer system's registers and memories and other computer readable media into other data similarly represented as physical quantities within the computer system memories or registers or other such information storage, transmission or display devices.

Computer System Platform:

FIG. 1 shows a computer system 100 in accordance with one embodiment of the present invention. Computer system 100 depicts the components of a basic computer system in accordance with embodiments of the present invention providing the execution platform for certain hardware-based and software-based functionality. In general, computer system 100 comprises at least one CPU 101, a system memory 115, and at least one graphics processor unit (GPU) 110. The CPU 101 can be coupled to the system memory 115 via a bridge component/memory controller (not shown) or can be directly coupled to the system memory 115 via a memory controller (not shown) internal to the CPU 101. Computer system 100 includes a processor component 120 that has the GPU 110 and a VPU 111 (video processor unit). The GPU 110 is coupled to a display 112. One or more additional GPUs can optionally be coupled to system 100 to further increase its computational power. The GPU(s) 110 is coupled to the CPU 101 and the system memory 115. The VPU 111 is for executing video processing operations, video encoding and decoding, and the like.

System 100 can be implemented as, for example, a desktop computer system or server computer system, having a powerful general-purpose CPU 101 coupled to a dedicated graphics rendering GPU 110. In such an embodiment, components can be included that add peripheral buses, specialized graphics memory, IO devices, and the like. Similarly, system 100 can be implemented as a handheld device (e.g., cellphone, etc.) or a set-top video game console device such as, for example, the Xbox®, available from Microsoft Corporation of Redmond, Wash., or the PlayStation3®, available from Sony Computer Entertainment Corporation of Tokyo, Japan. In one embodiment, the CPU 101, Bridge 105, system memory 115 and processor component 120 can be fabricated as a system-on-a-chip device.

Figure 2:
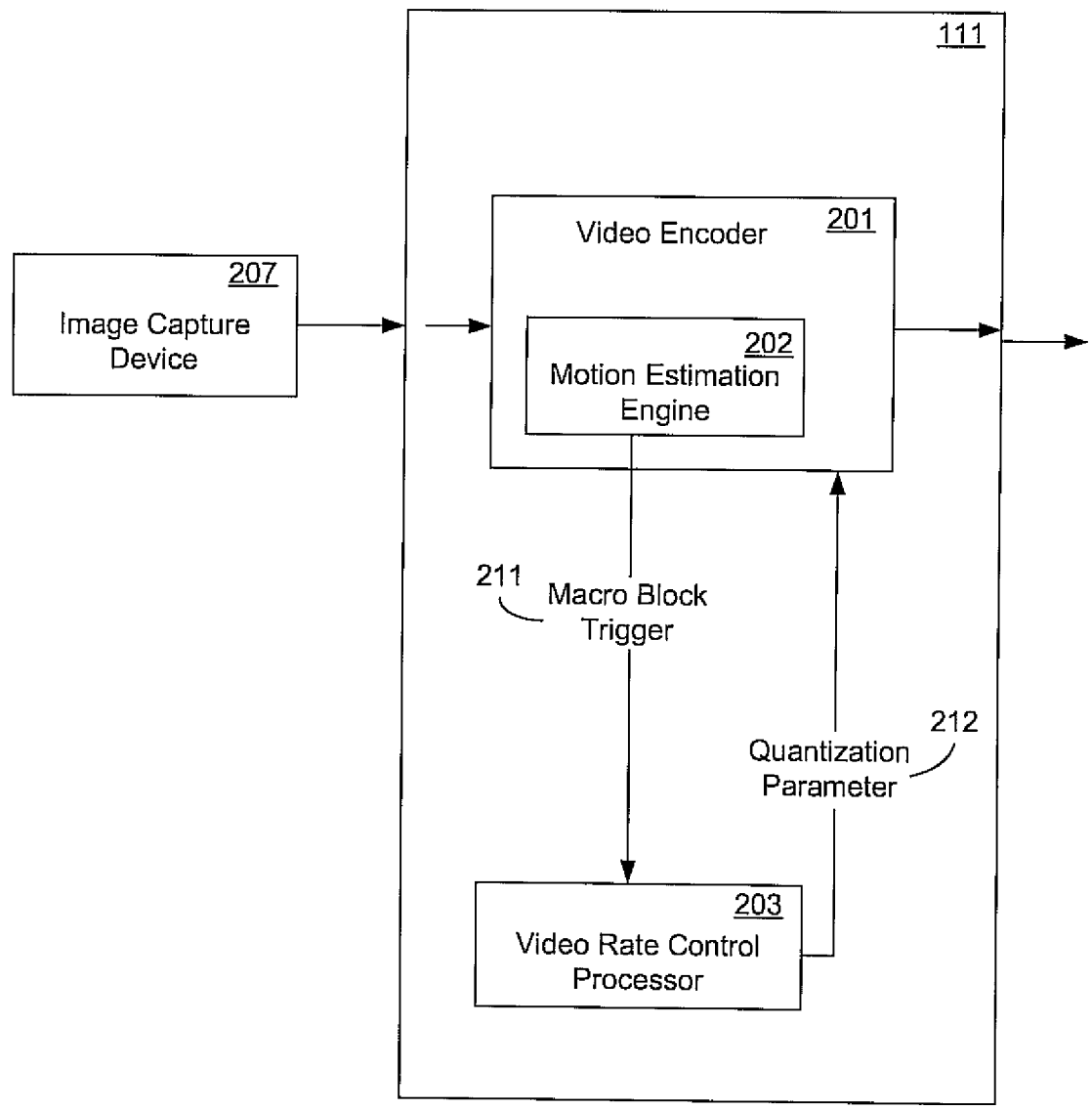
FIG. 2 shows a diagram illustrating the basic components of a video processor in accordance with one embodiment of the present invention.

Exemplary Embodiments:

FIG. 2 shows a diagram illustrating the basic components of a video processor in accordance with one embodiment of the present invention. As depicted in FIG. 2, the VPU 111 is shown including a video encoder 201, a motion estimation engine 202 and a video rate control processor 203.

In the FIG. 2 embodiment, the VPU 111, hereafter referred to as the video processor 111, functions by enabling real-time encoding of video streams. As shown in FIG. 2, the video processor 111 includes the video encoder 201 for encoding an incoming video stream into a plurality of macro blocks. The incoming video stream originates from, for example, an image capture device 207 shown coupled to the video processor 111. A motion estimation engine 202 is included within the video encoder 201 for controlling the encoding of the macro blocks. The video rate control processor 203 is coupled to the video encoder 201 and coupled to the motion estimation engine 202. The video rate control processor 203 receives a plurality of parameters from the video encoder 201 that indicate an encoding complexity for a macro block and a video frame of the video stream.

Upon receiving an indication (e.g., all macroblocks of a frame have been generated) from the motion estimation engine 202, the video rate control processor 203 computes a quantization parameter for the macro block. The indication is shown in FIG. 2 as the macroblock trigger 211. The quantization parameter is shown as the signal 212. In one embodiment, the quantization parameter is dynamically adjusted for the video stream to achieve a target bit rate. In one embodiment, this adjustment occurs on a macro block by macro block basis. In such an embodiment, each successive macro block can receive its own dynamically computed quantization parameter.

In one embodiment, one of the plurality of parameters received by the video rate control processor can be SAD (sum of absolute difference). Another one of the parameters can be MAD (mean absolute difference). Additionally, one of the parameters can be the position of a macro block within the video frame and/or the position of the video frame within a group of video frames.

In one embodiment, the video rate control processor 203 uses historical parameters to aid in the computation of a quantization parameter. For example, the video rate control processor 203 can use a plurality of prior parameters (e.g., SAD, MAD, etc.) from one or more prior video frames of the stream.

In each of the above described embodiments, it should be noted that an objective of the video processor 111 is to dynamically adjust the quantization parameter to adjust for varying video conditions. One of the most common uses that require adjustment are those cases where communication channel conditions change over time. In such a situation, the video processor 111 will dynamically adjust the quantization parameter to obtain an optimal state that is fitted to communications channel characteristics. This can reduce the effects of noise, bandwidth congestion, and other variable factors on the quality of the resulting encoded video, shown emerging from the right hand side of the video encoder 201.

Referring still to FIG. 2, it should be noted that a video rate control processor in accordance with the present invention (e.g., video rate control processor 203) can be used to control the bit rate of a number of different types of video encoder rate control algorithms. The video rate control processor 203 can be used for implementing different rate control algorithms on H264, MPEG4 and H263 video streams. Rate control is one of the most important and complicated components in a video encoder. Rate control analyzes a variety of encoding parameters, by which it dynamically adjusts the quantization parameter (QP) to achieve the target bit rate. These parameters are usually different in terms of size, range, precision and nature.

For example, in a typical scenario, the video rate control processor 203 will try to maintain a constant bit rate while achieving the best possible video encoding quality at that bit rate. In many usage scenarios, a selected bit rate is dictated by a software application executing on the system (e.g., a video real-time encoding application). The selection is typically based on the available channel bandwidth or the desired file size. In streaming applications, sometimes the channel bandwidth is not constant (e.g., affected by noise, congestion, etc.).

In one embodiment, the software application periodically communicates information regarding target bit rate and desired file size to video rate control processor 203 by programming one or more registers of the processor. The video rate control processor reads the programmed information and subsequently will adapt to the varying channel characteristics to yield the best possible quality at the available bandwidth.

To achieve the best quality while maintaining the constant bit rate, the rate control processor 203 executes a rate control algorithm that takes into account several dynamic parameters that have occurred over the past few frames and macro blocks. In one embodiment, these parameters are typically the SAD/MAD, actual coding cost of headers and residue data, past quantization parameters, the position of a macroblock within a frame and the position of a frame within a group of frames.

As described above, the software application communicates the desired bit rate, the encoder-decoder buffer delay and the desired quality level by programming a certain set of registers of the video rate control processor 203. In one embodiment, at the beginning of each frame, the rate control algorithm will first determine a bit budget for the next frame, based on the programmed registers and the past history. As macroblocks are encoded from left to right and top to bottom within a frame, the rate control algorithm will distribute the bits among the different macroblocks. This distribution is based on the complexity and the actual coded cost of the past macroblocks by determining the appropriate quantization parameter (Qp). The parameters used in this computation will be different in terms of size, dynamic range, precision and nature. Moreover the functions involved in the quantization parameter computation are typically quadratic in nature and will require multiplication, division, addition and subtraction.

It should be noted that the video rate control processor 203 can also be used to support a number of different rate control algorithms with no or minimal changes. The quantization parameter computation is very closely coupled to the actual video encoding process and cannot be done in software (e.g., executing on a general-purpose CPU) without paying severe pipelining penalty. The video rate control processor 203 advantageously implements its rate control algorithms in hardware, thereby yielding sizable speed advantages. The speed advantage is very important in obtaining high quality video at a desired bit rate, especially at higher resolutions.

Figure 3:
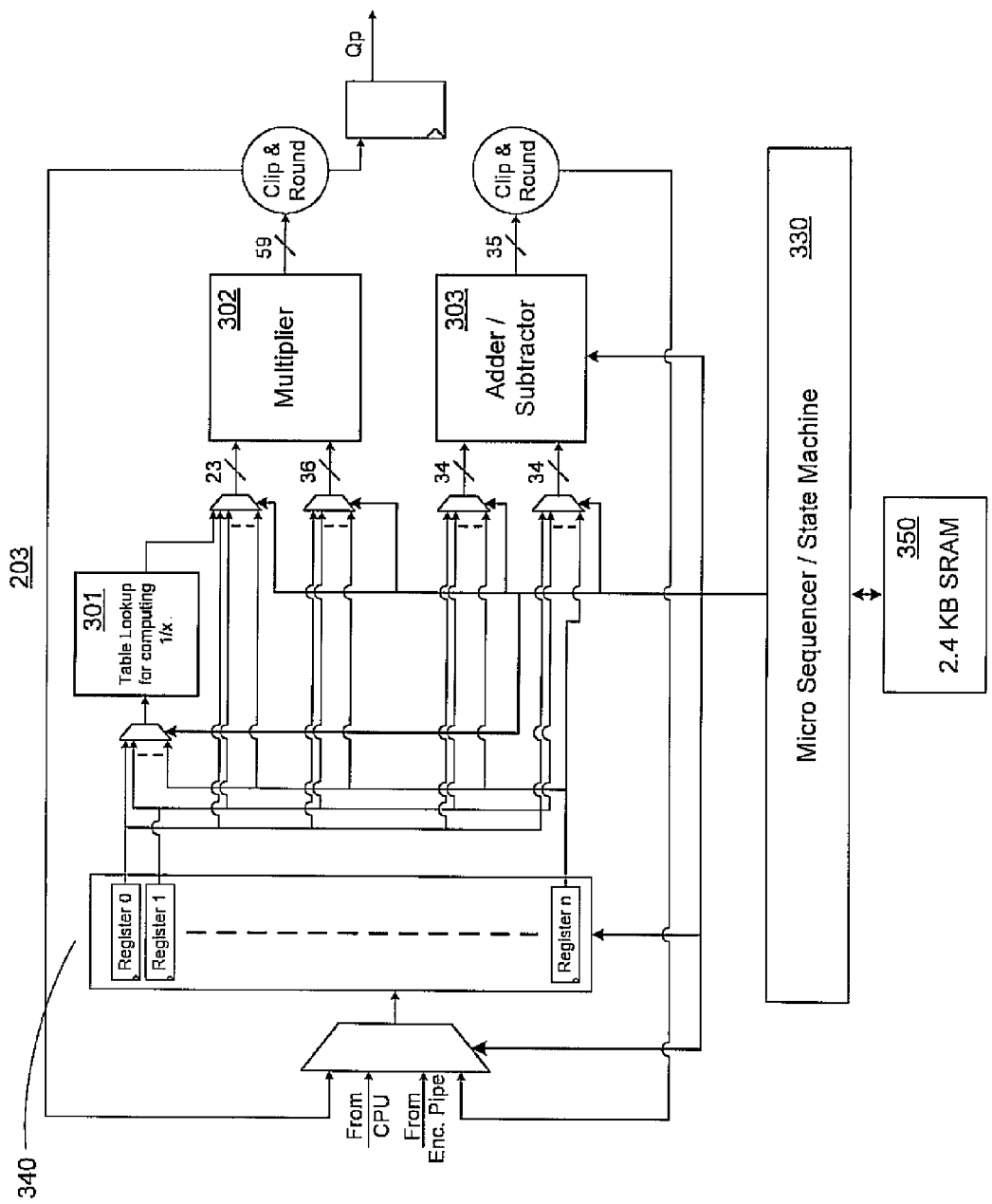
FIG. 3 shows an exemplary architecture of a video rate control processor in accordance with one embodiment of the present invention.

FIG. 3 shows an exemplary architecture of the video rate control processor 203 in accordance with one embodiment of the present invention. As depicted in FIG. 3, the video rate control processor 203 includes a lookup table component 301, a multiplier component 302, and an adder/subtractor component 303.

As shown in the FIG. 3 embodiment, the video rate control processor 203 uses one adder/subtractor 303 (e.g., 34-bit), one multiplier 302 (e.g., 36-bit×23-bit), and the lookup table component 301 to compute reciprocal function and clipping logic. The inputs to these arithmetic units 301-303 are controlled by a micro sequencer 330. Intermediate results are stored in a register bank 340 at the input of the video rate control processor 203. Most of the registers are accessible by the software application(s). For example, software can initially program one or more of these registers (e.g., of the register bank 340) with the desired bit rate and quality level. Actual encoding parameters are updated in some of these registers by the encoder pipeline of the video encoder 201.

The micro sequencer 330 will wait for the frame start and will use the appropriate registers to compute the frame budget. It will then wait for the start of a macroblock trigger from the motion estimation engine 202 (e.g., shown in FIG. 2) and will schedule the inputs to the arithmetic units 301-303 to compute the quantization parameter. Intermediate statistics and data are stored in an external memory 350 (e.g., 2.4 KB SRAM). The video rate control processor 203 will operate in parallel with the rest of the encoder pipeline and is not really constrained by cycle budget. Hence any complex rate control functions can be realized on the processor 203 with out affecting the encoder throughput.

For example, multiple different rate control algorithms can be executed on the processor 203 for MPEG4, H263 and H264 video streams. In a typical usage scenario, the video rate control processor 203 is able to compute the quantization parameter within 30 cycles for each macro-block of a frame using one rate control algorithm. Different rate control algorithms can yield different results. Additionally, it should be noted that the floating point arithmetic is converted to fixed point arithmetic in its entirety and this attribute has yielded the best quality within a given precision. By using the appropriate micro sequencer, a number of different rate control algorithms can be implemented.

Figure 4:
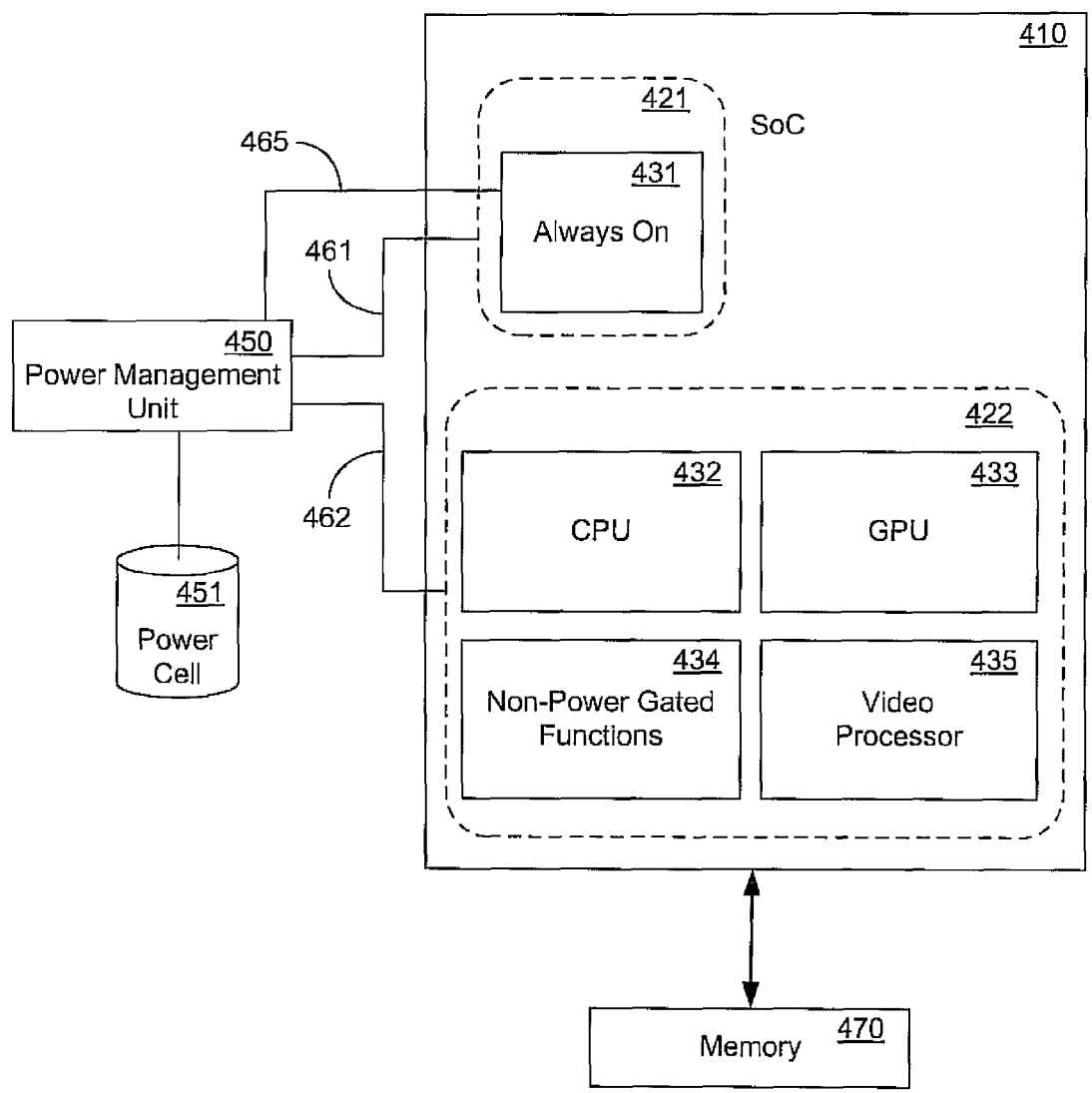
FIG. 4 shows an exemplary architecture that incorporates a video processor in accordance with one embodiment of the present invention.

FIG. 4 shows an exemplary architecture that incorporates the video processor 203 in accordance with one embodiment of the present invention. As depicted in FIG. 4, system 400 embodies a programmable SOC integrated circuit device 410 which includes a two power domains 421 and 422. The power domain 421 includes an "always on" power island 431. The power domain 422 is referred to as the core of the SOC and includes a CPU power island 432, a GPU power island 433, a non-power gated functions island 434, and an instance of the video processor 111. The FIG. 4 embodiment of the system architecture 400 is targeted towards the particular intended device functions of a battery-powered handheld SOC integrated circuit device. The SOC 410 is coupled to a power management unit 450, which is in turn coupled to a power cell 451 (e.g., one or more batteries). The power management unit 450 is coupled to provide power to the power domain 421 and 422 via the dedicated power rail 461 and 462, respectively. The power management unit 450 functions as a power supply for the SOC 410. The power management unit 450 incorporates power conditioning circuits, voltage pumping circuits, current source circuits, and the like to transfer energy from the power cell 451 into the required voltages for the rails 461-462.

In the FIG. 4 embodiment, the video processor 111 is within the domain 422. The video processor 111 provides specialized video processing hardware for the encoding of images and video. As described above, the hardware components of the video processor 111 are specifically optimized for performing real-time video encoding. The always on power island 431 of the domain 421 includes functionality for waking up the SOC 410 from a sleep mode. The components of the always on domain 421 will remain active, waiting for a wake-up signal. The CPU power island 432 is within the domain 422. The CPU power island 432 provides the computational hardware resources to execute the more complex software-based functionality for the SOC 410. The GPU power island 433 is also within the domain 422. The GPU power island 433 provides the graphics processor hardware functionality for executing 3-D rendering functions.

Figure 5:
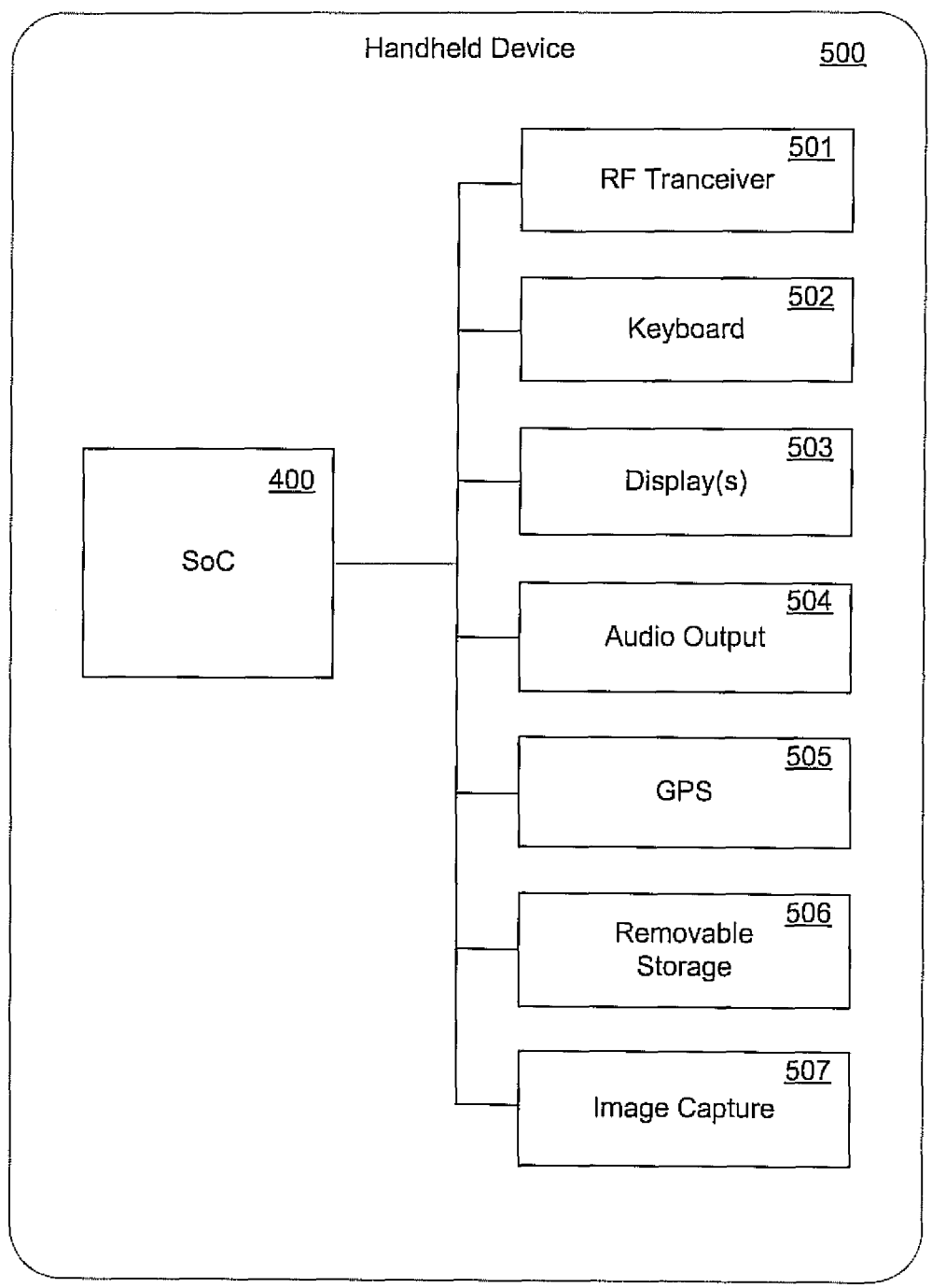
FIG. 5 shows a diagram showing the components of a handheld device incorporating a video processor in accordance with one embodiment of the present invention.

FIG. 5 shows a diagram showing the components of a handheld device 500 in accordance with one embodiment of the present invention. As depicted in FIG. 5, a handheld device 500 includes the system architecture 400 described above in the discussion FIG. 4. The handheld device 500 shows peripheral devices 501-507 that add capabilities and functionality to the device 500. Although the device 500 is shown with the peripheral devices 501-507, it should be noted that there may be implementations of the device 500 that do not require all the peripheral devices 501-507. For example, in an embodiment where the display(s) 503 are touch screen displays, the keyboard 502 can be omitted. Similarly, for example, the RF transceiver can be omitted for those embodiments that do not require cell phone or WiFi capability. Furthermore, additional peripheral devices can be added to device 500 beyond the peripheral devices 501-507 shown to incorporate additional functions. For example, a hard drive or solid state mass storage device can be added for data storage, or the like.

The RF transceiver 501 enables two-way cell phone communication and RF wireless modem communication functions. The keyboard 502 is for accepting user input via button pushes, pointer manipulations, scroll wheels, jog dials, touch pads, and the like. The one or more displays 503 are for providing visual output to the user via images, graphical user interfaces, full-motion video, text, or the like. The audio output component 504 is for providing audio output to the user (e.g., audible instructions, cell phone conversation, MP3 song playback, etc.). The GPS component 505 provides GPS positioning services via received GPS signals. The GPS positioning services enable the operation of navigation applications and location applications, for example. The removable storage peripheral component 506 enables the attachment and detachment of removable storage devices such as flash memory, SD cards, smart cards, and the like. The image capture component 507 enables the capture of still images or full motion video. The handheld device 500 can be used to implement a smart phone having cellular communications technology, a personal digital assistant, a mobile video playback device, a mobile audio playback device, a navigation device, or a combined functionality device including characteristics and functionality of all of the above.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A system for executing video encoding operations, comprising:
    a video encoder for encoding an incoming video stream into a plurality of macro blocks;
    a motion estimation engine coupled to the video encoder for controlling the encoding of the macro blocks; and
    a video rate control processor coupled to the video encoder and coupled to the motion estimation engine, wherein the video rate control processor receives a plurality of parameters from the video encoder that indicate an encoding complexity for a macro block and a video frame of the video stream and, upon receiving an indication from the motion estimation engine, computes a quantization parameter for the macro block, wherein the plurality of parameters can be SAD (sum of absolute difference), MAD (mean absolute difference), the position of a macro block within the video frame, the position of the video frame within a group of video frames, and/or prior parameters from a prior video frame, wherein the quantization parameter is dynamically adjusted for the video stream to achieve a target bit rate, wherein the quantization parameter is dynamically adjusted for the video stream for varying channel bandwidth, and wherein the quantization parameter is dynamically adjusted for the video stream for channel characteristics variations of noise and bandwidth congestion for a channel.

2. A method for executing video encoding operations, comprising:

encoding an incoming video stream into a plurality of macro blocks by using a video encoder;

controlling the encoding of the macro blocks by using a motion estimation engine coupled to the video encoder;

generating a plurality of parameters from the video encoder that indicate an encoding complexity for macro block and a video frame of the video stream wherein the plurality of parameters can be SAD (sum of absolute difference), MAD (mean absolute difference), the position of a macro block within the video frame, the position of the video frame within a group of video frames, and/or prior parameters from a prior video frame; and computing a quantization parameter for the macro block by using a video rate control processor coupled to the video encoder, wherein the quantization parameter is dynamically adjusted for the video stream to achieve a target bit rate, wherein the quantization parameter is dynamically adjusted for the video stream for varying channel bandwidth, and wherein the quantization parameter is dynamically adjusted for the video stream for channel characteristics variations of noise and bandwidth congestion for a channel.

3. A video encoder for executing video encoding operations, comprising:

a video encoder for encoding an incoming video stream into a plurality of macro blocks;

a motion estimation engine coupled to the video encoder for controlling the encoding of the macro blocks;

a video rate control processor coupled to the video encoder and coupled to the motion estimation engine, wherein the video rate control processor receives a plurality of parameters from the video encoder that indicate an encoding complexity for macro block and a video frame of the video stream wherein the plurality of parameters can be SAD (sum of absolute difference), MAD (mean absolute difference), the position of a macro block within the video frame, the position of the video frame within a group of video frames, and/or prior parameters from a prior video frame, and;

wherein upon receiving an indication from the motion estimation engine, the video rate control processor computes a quantization parameter for the macro block, wherein the quantization parameter is dynamically adjusted for the video stream for varying channel bandwidth, wherein the quantization parameter is dynamically adjusted for the video stream for varying channel bandwidth, and wherein the quantization parameter is dynamically adjusted for the video stream for channel characteristics variations of noise and bandwidth congestion for a channel.

4. The system of claim 1, wherein the video rate control processor performs its rate control algorithms in hardware at a predetermined bit rate.

5. The system of claim 4, wherein the hardware comprises an adder, a subtractor, a multiplier, a look-up table.

6. The system of claim 4, wherein the hardware comprises a micro sequencer, wherein the micro sequencer waits for the frame start and uses registers to compute a frame budget.

7. The video encoder of claim 3, wherein the video rate control processor performs its rate control algorithms in hardware at a predetermined bit rate.

8. The video encoder of claim 5, wherein the hardware comprises an adder, a subtractor, a multiplier, a look-up table.

9. The video encoder of claim 5, wherein the hardware comprises a micro sequencer, wherein the micro sequencer waits for the frame start and uses registers to compute a frame budget.

\* \* \* \* \*